United States Patent [19]

Lin

[11] 4,171,982
[45] Oct. 23, 1979

[54] ACID INDICATOR BASED HIGH SATURATION SYMPATHETIC INK HAVING TIME DELAYED DISAPPEARANCE

[75] Inventor: An-Chung R. Lin, Fairport, N.Y.

[73] Assignee: Burroughs Corporation, Detroit, Mich.

[21] Appl. No.: 796,793

[22] Filed: May 13, 1977

[51] Int. Cl.$^2$ .................... C09D 11/00; C09D 11/02
[52] U.S. Cl. ........................................ 106/21; 106/22
[58] Field of Search ................................. 106/21, 22

[56] References Cited

FOREIGN PATENT DOCUMENTS

| | | | |
|---|---|---|---|
| 2015829 | 10/1971 | Fed. Rep. of Germany | 106/21 |
| 2505077 | 8/1976 | Fed. Rep. of Germany | 106/21 |
| 1373770 | 8/1963 | France | 106/21 |

OTHER PUBLICATIONS

Lesser, Milton A., Invisible or Sympathetic Inks, an American Ink Maker, Nov. 1945, pp. 27–30.

*Primary Examiner*—Allan Lieberman
*Attorney, Agent, or Firm*—Lynn L. Augspurger; Kevin R. Peterson; Edward J. Feeney

[57] ABSTRACT

Disclosed is an ink that is intensely colored in solution with the vehicle of the ink. The ink "disappears" or becomes invisible to the naked eye after a period of time has elapsed from the application of the ink to a record document, the ink being utilized to identify an unsatisfactory character on a document such as a MICR check which has had an erroneous character printed which must be corrected before being correctly machine read.

5 Claims, No Drawings

ACID INDICATOR BASED HIGH SATURATION SYMPATHETIC INK HAVING TIME DELAYED DISAPPEARANCE

BACKGROUND OF THE INVENTION

This invention relates generally to systems for reading characters and more particularly to an ink formulation of the sympathetic type which are used to mark characters to identify machine readable characters having a need of a correction.

In particular the ink is utilized in order to print the marking dot which is described, for example, as a disappearing ink spot, as in United States Patent Application Ser. No. 573,787, filed May 1, 1975 now U.S. Pat. 4,068,212 granted Jan. 10, 1978 entitled, "Method and Apparatus for identifying Characters Printed on a Document which can not be Machine Read", said application being incorporated herein by reference in its entirety.

As mentioned in the application referred to above, ink from a reservoir is applied to a document to cause a marking dot to appear adjacent an unsatisfactory character. If the document may be handled by humans at a later time after correction of the character, the presence of the marking dot may cause confusion since the viewer will be unable to determine whether or not the character which appears to be machine readable has been corrected. It was suggested in the aforesaid application that it would be desirable to use a "disappearing" ink. Such a sympathetic ink will have a color change to an invisible shade or a slightly visible or invisible shade shortly after the document leaves an inspection-correction station. In order to aid the operator in identifying a character to be corrected as each document which passes a read station is inspected electrically and after determination is made that the document cannot be read the "can't read" mark is printed with the sympathetic ink adjacent the unreadable character. This identifies the character which must be corrected by an operator.

The requirements of this sympathetic ink are that it be of high saturation so as to clearly identify the unsatisfactory character yet it cannot mar the document nor can the document be discolored by subsequent handling. The ink should disappear shortly after the time required to correct the document.

THE PRIOR ART

An earlier application Ser. No. 654,125 filed Feb. 2, 1976 which has been abandoned in favor of continuation application Ser. No. 833,521, filed Sept. 14, 1977, has been filed by my associates. In that application the prior art is discussed. The earlier application is incorporated fully herein by reference. Sympathetic inks have been known as novelties since Ovid and Pliny the Elder (see C. E. Waters, Inks, Circular of the National Bureau of Standards, C. 426, 1940).

There are three general types of sympathetic inks, those which are originally invisible but become dark upon heating, those which appear to change in the background by wetting a paper and the type that is developed by a reaction. Of the later type, the well known reaction of tincture of iodine and starch or soap yields a colored ink which will disappear after a period of time. Copper sulphate and red acetate are colored temporarily. Copper sulphate on exposure to ammonia fumes which give a dark blue compound, but exposure of the ammonia to air causes the writing to become invisible due to the high volatility of ammonia.

Also well known for many years has been the use of a reagent, such as phenophthalein which turns a brilliant red in the presence of alkaline material, e.g., sodium carbonate, borax, or ammonia, (see Printing Inks, Carleton Ellis, Reinhold Publishing Corporation, 1940, p. 405). The problem with most of the reagent mixtures is that the color once presented is permanent and the action cannot be reversed, or for those that do disappear the color is not stable in solution so that shelf life is too short, or for those that store well the period of time before disappearance does not accommodatingly disappear at a predetermined time, as for instance in the case with the formulation of U.S. Pat. No. 3,244,549, Column 14, lines 5–18.

It is also known, see U.S. Pat. No. 3,617,325, Nov. 2, 1971, Spokes, et al, to apply an alkanolamine to a coating on paper containing orthocresol-phthalein such that the conjunction of the amine and the phthalein produces a blue image which disappears after a time lapse. This patent does not store the ink in solution.

SUMMARY OF THE INVENTION

The objective of the invention is to provide a high saturation sympathetic ink which disappears after a predetermined time lapse and which can be applied to a variety of ordinary commercial papers or films and yet disappears after a predetermined time lapse. This objective is fulfilled in my preferred formulations by the use of a dye in acidic formulation which has advantages over a dye in basic formulations, such as those disclosed in the aforementioned copending application, Ser. No. 654,123 filed Feb. 2, 1976 entitled, "High Saturation Sympathetic Ink Having Time Delayed Disappearance" (assigned to our common assignee). These basic solutions tend to leave a salt behind on the nib of the applicator pen, a fault overcome by my preferred embodiments.

It is an important feature of my invention that the ink in solution, when exposed to air is not noticeably affected. In addition the ink is stable, has a high contrast and is suitable for application to documents through porous nibs.

The formulation of the preferred embodiments of this invention can be had by reference to the following detailed description of the inventions.

DETAILED DESCRIPTION OF THE INVENTION

The preferred embodiments of my invention are incorporated in an ink utilizing indicator dyes which become colorless at higher pH levels. In the course of my associates at Burroughs investigation, they and I discarded the use of fluorescent ink formulations as those utilizing General Electric's organic phosphors, Catalogue No. 118-15-1 (blue) and No. 118-15-2 (yellow) because it is difficult to obtain sufficient phosphor loadings in the inks in order to obtain crisp visibility utilizing ultraviolet (black) light in a commercial surroundings as in daylight or under office lighting conditions. In addition, in order to avoid confusion in the future, the marks cannot be "permanent" as is the case of fluorescent colors and most dye formulations.

I have discovered that the desired "disappearing inks" can be obtained from a mixed acid based system which maintains color in solution and yet which upon exposure to air does not disappear rapidly but over a predetermined extended period of time. In order to obtain the sufficient high saturation so as to obtain the required contrast in daylight and under office lighting conditions when the ink is applied to ordinary documents such as checks, I have found that the most useful formulations suitable for use are those given in the examples below.

The formulations resulting from my investigation are readily visible and disappear slowly when exposed on paper to air. The ink meets a 70% visibility test two minutes after printing; is 50% visible after five minutes, but has almost completely disappeared (less than 20% visible) after eight hours from printing, after exposure to air. It can be stored for a period exceeding six months in a polyethylene container with plastic screw-on top. The ink is of high contrast with a background ranging from white through the pastels used for checks.

It will be understood that in the examples all percentages given are percentages by weight, if liquid, weight wet.

The variances which are acceptable from the percentages by weight given are ±15% of the stated percentage or weight.

The principle of thymol blue (color change) or disappearing ink is a little different from ethyl red (cyanine dye). Solvent and acids have some difference.

I have found that it is especially advantageous to provide mixed alcohol, glycol and glycol ether solvent solutions for the dyes which are employed to provide color for the ink.

The range of any specific solvent in my preferred embodiments may vary by 20% to 50% by weight. This range from the examples is applicable regardless of the stated percentages by weight so long as the aggregate solvent does not exceed 90% (even 95%) by weight of the formulation.

The preferred alcohols, glycols and glycol ethers include butyl carbitol, butyl cellosolve, ethylene glycol, diethylene glycol, Methoyoxy triethylene glycol, and benzyl alcohol.

Additional solvents will be chosen from the above group alone, in combination or in combination with the following group of solvents having a high boilding point, (preferably higher than 220° C.). These solvents include triethylene glycol, diethylene glycol, tetraethylene glycol, phenol ethylene glycol ether, butoxy diethylene glycol and butoxy triethylene glycol.

The principle which I employ is that the solvents maintain the dye and the acids in solution permitting the dye, which is a known pH indicator dye to remain in its colored state. However, upon application of the ink to paper, the pH of paper will cause the color to disappear within the above stated parameters, as will be explained below.

The ink passes through the nibs by capillary action. The nib may be the high density porous polyethylene nibs, such as are commercially available.

The preferred embodiment of my invention uses an acid based dye and high boiling point solvents. When the ink was applied on the paper, the acids and solvents were absorbed by the paper, and the pH of ink will gradually be changed by the paper. The color of the acid indicator will slowly disappear.

Here an acid is used as a chemical reactant. It is noted that the $CO_2$ in the atmosphere is also acid and does not cause degradation of the system upon exposure to air.

Likewise, no salts are left at the nib of the applicator in the acid system which I prefer. The saturation levels are high and the disappearance is effectively achieved.

Acids which are suitable for substitution may be selected from the group including citric acid, tartaric acid, oxalic acid, acetic acid, formic acid, trichloroacetic acid and some inorganic acids including $H_3PO_4$, $H_3PO_3$ and HCl.

I have found that the acid-base indicators, particularly the phthaleins are the most suitable dyes which may be used to obtain the desired high saturation. While cyanine dyes have been used, and my preferred embodiment which uses ethyl red is the subject of a copending application, I have found that the shelf life of the phthalein dyes may be much greater. Accordingly in my preferred embodiment I prefer to use the phthalein dyes which become substantially colorless or light yellow color as they approach neutral. Particularly, I prefer to use thymol blue for its color change properties at very low pH levels.

My preferred formulation using thymol blue also employs a combined acid, which combined acid is used to control the color time change. As a single acid I prefer to employ oxalic acid, but substitutions may be made from the foregoing group.

In all cases my preferred solvent would be that illustrated above. Substitution may be made from the indicated solvent groups.

Accordingly my preferred example using a combined acid would be

| Example One | | |
|---|---|---|
| | Weight | Percentage |
| Thymol Blue | 0.6 g | 0.92 |
| Benzyl Alcohol | 35.0 | 53.85 |
| Butyl Carbitol | 15.0 | 23.08 |
| Ethylene glycol | 10.0 | 15.39 |
| Al Cl$_3$ | 3.5 | 5.38 |
| HCL conc. | 0.9 | 1.38 |
| Total | 65.0 | |

To prepare this example dissolve thymol blue in benzyl alcohol and then butyl carbitol and ethylene glycol. The aluminum chloride is dissolved in this solution (stir about 1 Hr.) and concentrated hydrochloric acid added.

Other examples may be as follows:

| Example II | | |
|---|---|---|
| | Weight | Percentage |
| Thymol blue | 1.2 | 0.90 |
| Benzyl alcohol | 99.1 | 74.12 |
| HCL conc. | 3.0 | 2.24 |
| Ethylene Glycol | 10.4 | 7.78 |
| Butyl Carbitol | 20.0 | 14.96 |
| Total | 133.7 | |

| Example III | |
|---|---|
| | Percentage |
| Butyl Carbitol | 29.59 |
| Ethylene Glycol | 14.79 |
| Benzyl Alcohol | 44.38 |
| Al Cl$_3$ | 10.35 |
| Thymol Blue | 0.89 |

| Example IV | | |
|---|---|---|
| | Weight | Percentage |
| Benzyl Alcohol | 84 | 65.93 |
| Butyl Carbitol | 15 | 11.77 |
| Ethylene Glycol | 25 | 19.62 |
| Thymol Blue | 1.1 | 0.87 |
| Oxalic Acid | 2.3 | 1.81 |
| Total | 127.4 | |

Example V

| | Percentage |
|---|---|
| Thymol Blue | 0.9 |
| Butyl Carbitol | 54.5 |
| Diethylene glycol | 23.7 |
| HCL (conc.) | 1.7 |
| NiCl$_2$ | 5.2 |
| CCl$_3$COOH | 6.5 |
| H$_2$O | 7.5 |

In all of the above examples the ink remains highly saturated, more than 50% visible 5 minutes after application to paper. Color change then proceeds occurring as the neutral paper causes a slight pH level change of the ink in amount sufficient to cause the desired color change.

While I have given a preferred example and several alternate examples, it will be understood that those skilled in the art may now or in the future make rearrangements, and substitutions without departing from the scope of the claims which follow.

What is claimed is:

1. A high saturation disappearing sympathetic ink having a time delayed disappearance consisting essentially of:
    a solvent, and,
    a reactive additive consisting of 2.68 to 14.3% by weight (±15%) of the ink, the reactive additive consisting essentially of a pH acid base indicator phthalein dye consisting of 6% to 32% by weight (±15%) and a solvent soluble acid,
    said solvent soluble acid being chosen from a group consisting of citric acid, tartaric acid, oxalic acid, acetic acid, formic acid, phosphorous acid, phosphoric acid, and hydrochloric acid, aluminum chloride, trichloracetic acid nickel chloride and mixtures thereof;
    said solvent consisting of the remainder of the ink by weight, the solvent being chosen from the group in which said acids are soluble and consisting of methyoxy triethylene glycol, triethylene glycol, diethylene glycol, tetraethylene glycol, butoxy diethylene glycol, butoxy triethylene glycol, ethylene glycol, phenol ethylene glycol ether, ethylene glycol monobutyl ether and diethylene glycol monobutyl ether and alcohols including butyl alcohol, benzyl alcohol and mixtures thereof, and
    wherein said ink remains 50% visible 5 minutes after application of the ink to paper and disappears to a less than 20% visibility eight hours from printing and on exposure to air.

2. An ink according to claim 1 wherein said dye is thymol blue.

3. An ink according to claim 1 wherein said acid is selected from a group consisting of trichloroacetic acid, oxalic acid, nickel chloride, aluminum chloride, and hydrochloric acid and mixtures thereof.

4. An ink according to claim 1 wherein the solvent is selected from a group consisting of benzyl alcohol, diethylene glycol monobutyl ether, ethylene glycol, diethylene glycol and mixtures thereof.

5. A high saturation disappearing sympathetic ink which has a time delayed disappearance consisting essentially of, in percent by weight based on the total weight of the ink composition,
    a reactive additive consisting of 1.81 to 13.4% of an acid and 0.87 to 0.92% of thymol blue,
    said acid being chosen from a group consisting of oxalic acid, aluminum chloride, nickel chloride, trichloroacetic acid and hydrochloric acid and mixtures thereof,
    and a solvent for the reactive additive consisting essentially of, within a variance of 20 to 50%,
    zero to 74.12% benzyl alcohol,
    zero to 15.39% ethylene glycol,
    zero to 23.7% diethylene glycol,
    zero to 7.5% water and
    14.96 to 54.5% diethylene glycol monobutyl ether,
    wherein upon application of the ink to paper the paper causes a slight change in pH level in an amount sufficient to cause disappearance of color from the ink while remaining 50% visible 5 minutes after printing but disappearing to a less than 20% visibility eight hours from printing and on exposure to air.

* * * * *